(12) United States Patent
Forssell

(10) Patent No.: US 7,215,955 B2
(45) Date of Patent: May 8, 2007

(54) METHOD AND SYSTEM FOR RESTORING A SUBSCRIBER CONTEXT

(75) Inventor: Mika Forssell, Espoo (FI)

(73) Assignee: Nokia Corporation, Espoo (FI)

( * ) Notice: Subject to any disclaimer, the term of this patent is extended or adjusted under 35 U.S.C. 154(b) by 435 days.

(21) Appl. No.: 09/844,879

(22) Filed: Apr. 27, 2001

(65) Prior Publication Data

US 2002/0004395 A1 Jan. 10, 2002

Related U.S. Application Data

(63) Continuation of application No. PCT/EP98/07109, filed on Nov. 6, 1998.

(51) Int. Cl.
*H04Q 7/20* (2006.01)

(52) U.S. Cl. .............. 455/433; 455/45; 455/186.1; 455/423; 370/394; 370/328; 370/331

(58) Field of Classification Search ............. 455/433, 455/45, 186.1, 445, 560, 426, 418, 423, 424, 455/8; 370/394, 328, 331, 336
See application file for complete search history.

(56) References Cited

U.S. PATENT DOCUMENTS

| | | | | |
|---|---|---|---|---|
| 5,479,481 A | * | 12/1995 | Koivunen ................. | 455/433 |
| 5,594,942 A | * | 1/1997 | Antic et al. .............. | 455/423 |
| 5,729,537 A | * | 3/1998 | Billstrom ................. | 370/329 |
| 6,067,454 A | * | 5/2000 | Foti ........................ | 455/433 |
| 6,104,929 A | * | 8/2000 | Josse et al. .............. | 455/445 |
| 6,181,937 B1 | * | 1/2001 | Joensuu .................. | 455/433 |
| 6,256,498 B1 | * | 7/2001 | Ludwig ................... | 455/433 |
| 6,275,708 B1 | * | 8/2001 | Lahtinen ................. | 455/458 |
| 6,438,122 B1 | * | 8/2002 | Monrad et al. .......... | 370/349 |
| 6,480,476 B1 | * | 11/2002 | Willars .................... | 370/311 |
| 6,563,825 B1 | * | 5/2003 | Kari ........................ | 370/394 |
| 6,608,832 B2 | * | 8/2003 | Forslow .................. | 370/353 |
| 6,643,511 B1 | * | 11/2003 | Rune et al. .............. | 455/433 |
| 6,661,782 B1 | * | 12/2003 | Mustajarvi et al. ..... | 370/331 |
| 6,731,932 B1 | * | 5/2004 | Rune et al. ........... | 455/432.1 |

OTHER PUBLICATIONS

International Search Report for PCT/EP98/07109.
GSM 09.60 Version 6.2.0 (Nov. 1998), Release 1997, pp. 1-65.

* cited by examiner

*Primary Examiner*—Jean Gelin
*Assistant Examiner*—Khawar Iqbal
(74) *Attorney, Agent, or Firm*—Squire, Sanders & Dempsey L.L.P.

(57) ABSTRACT

A method and system for restoring a subscriber context in a network element of a mobile communication network is described, wherein a new subscriber context which has been updated after the latest restart is indicated by transmitting a corresponding restart information to the network element. Based on the restart information the network element continues the use of new subscriber contexts updated after the latest restart and inactivates old subscriber contexts updated before the latest restart. Thereby, the amount of unnecessary subscriber context re-activations and the corresponding downtime of the service is reduced. Moreover, the amount of signaling required after the restart is reduced, since a smaller number of subscriber contexts have to be re-established.

24 Claims, 3 Drawing Sheets

METHOD AND SYSTEM FOR RESTORING A SUBSCRIBER CONTEXT

This application is a continuation of international application Ser. No. PCT/EP98/07109, filed 6 Nov. 1998.

FIELD OF THE INVENTION

The present invention relates to a method and system for restoring a subscriber context in a network element such as a GPRS Support Node (GSN) of a mobile communication system such as the GPRS (General Packet Radio Service).

BACKGROUND OF THE INVENTION

Network elements such as a Serving GPRS Support Node (SGSN) and a Gateway GPRS Support Node (GGSN) of the GPRS usually send to each other echo request messages so as to poll that the other GSN, i.e. SGSN or GGSN, is alive.

A GSN receiving an echo request message responds with an echo response message which contains a restart counter value as a parameter. The GSN which receives the echo response message compares the received restart counter value with a previous restart counter value stored for that particular peer GSN.

If the previously stored restart counter value differs from the restart counter value received in the echo response message, the GSN that sent the echo response message is considered by the GSN that received the echo response message as being restarted. The received new restart counter value is stored by the receiving GSN, replacing the value previously stored for the sending GSN. Subsequently, the GSN that received the echo response message with the new (unexpected) restart counter value considers all subscriber contexts, i.e. Packet Data Protocol contexts (PDP contexts), relating to the sending GSN as inactive.

A VLR (Visitor Location Register) restart procedure is a similar procedure, wherein the VLR informs a HLR (Home Location Register) of the restart. When the VLR has been restarted, the complete set of subscriber information relevant to the VLR is transmitted to the VLR.

FIG. 1 shows a principle diagram indicating information transfers and processings of such an echoing procedure performed between two network elements NE1 and NE2. In FIG. 1, the processing starts at the top and moves to the bottom.

Initially, the network element NE2 transmits an echo request message to the network element NE1 which responses with an echo request response message including its restart counter value (N=n). If the restart counter values of both network elements are equal, the NE2 assumes that no restart has been performed since the last echo request.

Thereafter, mobile stations (MS) of the mobile communication network activate new subscriber contexts to the network elements, such that new contexts are created in the NE1 and NE2. The NE1 is then restarted due to a failure or the like, and its restart counter is incremented. Subsequently, MSs activate further subscriber contexts which are created in the NE1 and NE2.

If the NE2 now transmits an echo request message to the NE1, the restart counter value received in the echo response message differs from the value previously stored for the NE1. Accordingly, the NE2 assumes a restart of the NE1 and inactivates all subscriber contexts of the NE1, although some subscriber contexts were created after the restart of the NE1 and are thus still valid.

Thus, unnecessary subscriber context re-activations have to be performed and the downtime of the service is high.

SUMMARY OF THE INVENTION

It is therefore an object of the present invention to provide a method and system for restoring a subscriber context, wherein unnecessary subscriber context re-activations are prevented.

This object is achieved by a method for restoring a subscriber context in a network element of a mobile communication network, comprising the steps of:

transmitting a restart information indicating whether a subscriber context has been updated after the latest restart, continuing the use of a subscriber context updated after the latest restart, and inactivating a subscriber context updated before the latest restart.

Additionally, the above object is achieved by a system for restoring a subscriber context in a network element of a mobile communication network, comprising:

transmitting means for transmitting a restart information indicating whether a subscriber context has been updated after the latest restart to said network element, wherein said network element comprises receiving means for receiving the restart information and control means for continuing the use of a subscriber context updated after said latest restart and for inactivating the subscriber context updated before the latest restart, in response to the restart information.

Accordingly, the new subscriber contexts which have been updated after the latest restart of the network element are indicated and the use of a new subscriber context received after the restart can be continued. Thus, the amount of unnecessary subscriber context re-activations and consequently also the downtime of the service are reduced. This has a positive effect on the quality observed by an end user.

Moreover, the amount of signaling required after the restart procedure is reduced, since a smaller number of subscriber contexts have to be re-established.

Preferably, the restart information may be a restart counter value which is transmitted with a context signaling message. Thereby, the restart information is received very fast such that resources reserved for the effected subscriber contexts can be freed immediately and used when activating other subscriber contexts.

The restart counter value may be compared with a stored restart counter value so as to determine the subscriber context updated before the latest restart. In this case, the stored restart counter value can be updated on the basis of the transmitted restart counter value.

The transmission of the restart information may be performed conditionally, e.g. only one time after the latest restart. Thereby, signaling processing can be minimized.

The network element may be a GPRS support node, wherein the restart information is transmitted together with a tunnel management signaling message. In this case, the subscriber context may be a PDP context.

Furthermore, the network element may comprise a comparing means for comparing a restart number transmitted as said restart information with a restart number stored in a storing means and for supplying the comparing result to a control means for inactivating a subscriber context updated before the latest restart, in response to said restart number. The control means may perform control so as to store a new subscriber context included in the subscriber context message and to delete an old subscriber context stored in the network element.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

In the following a restoring method according to the preferred embodiment of the present invention will be described on the basis of FIG. 2.

Figure 1:
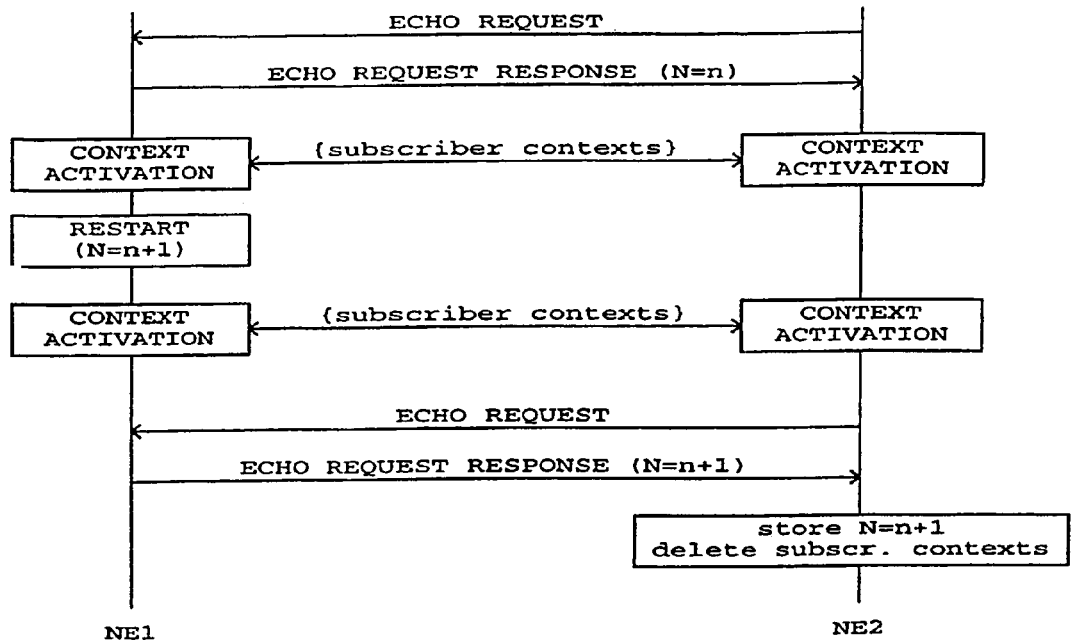
FIG. 1 shows an information transfer and processing diagram of a known echoing procedure performed between network elements.
Figure 2:
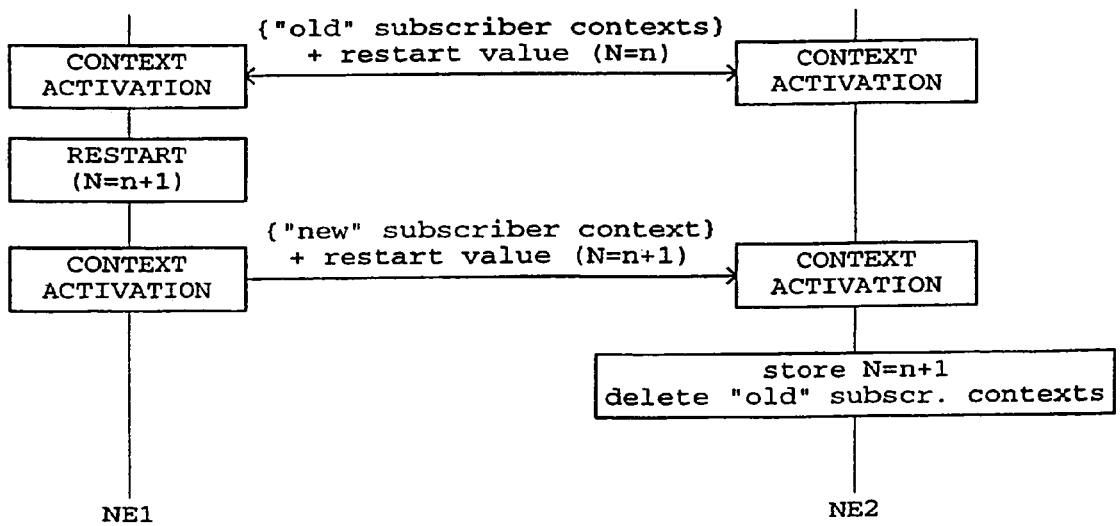
FIG. 2 shows an information transfer and processing diagram of a restoring method according to the preferred embodiment of the present invention.

FIG. 2 shows an information transfer and processing diagram indicating information transfers between and processings in the network elements NE1 and NE2. If an MS activates a subscriber context, a restart information such as a restart number (N=n) indicating the last restart is transmitted to the respective other network element. In case a restart is performed at the NE1, its restart number is incremented and a new restart number, i.e. N=n+1, is transmitted to the NE2, when a new subscriber context is activated at NE1.

Thus, by comparing the transmitted new restart number (N=n+1) with its stored previous restart number (N=n), the NE2 may determine the new subscriber context received after the restart of the NE1. Accordingly, the NE2 ia able to delete only the "old" subscriber contexts received before the restart of the NE1 and stores the new restart number N=n+1.

Thus, the subscriber contexts can be separated into those received before the restart of a network element and those received after the restart thereof.

Figure 3:
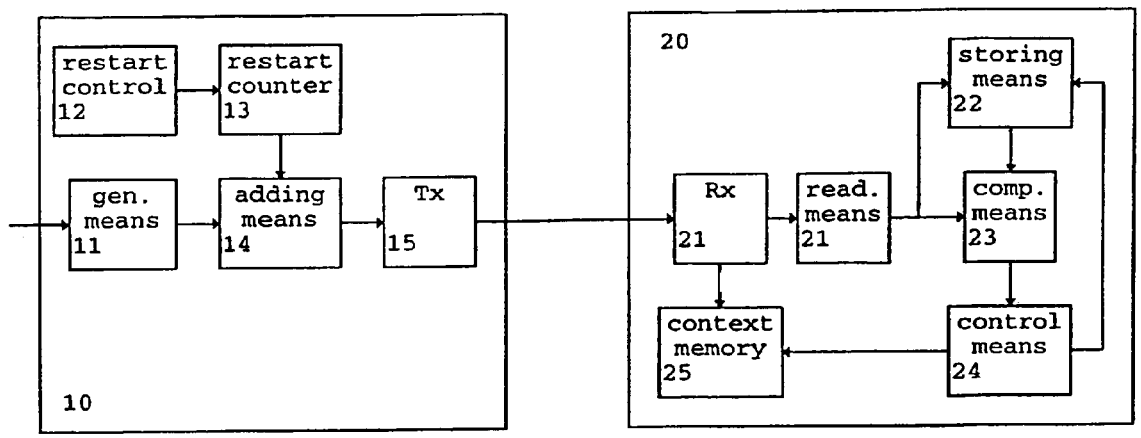
FIG. 3 shows a principle block diagram of a transmitting network element and a receiving network element of a restoring system according to the preferred embodiment of the present invention.

FIG. 3 shows a principle block diagram of a transmitting network element and a receiving network element of a system for restoring a subscriber context according to the preferred embodiment of the present invention.

According to FIG. 3, a transmitting network element 10 comprises a message generating means 11 for generating a subscriber context message used to create new subscriber contexts or to update addresses of subscriber contexts at the receiving network element 20. Furthermore, a restart control means 12 is provided which is arranged to increment a restart counter 13, when a restart operation of the transmitting network element 10 is performed.

The counter value of the restart counter 13 is added by an adding means 14 to the subscriber context message supplied from the message generating means 11. The subscriber context message and the added restart counter value are supplied to a transmitter 15 so as to be transmitted to the receiving network element 20.

At the receiving network element 20, a receiver 21 is provided for receiving the subscriber context message and the added counter value. The receiver 21 is arranged to supply the received information to a reading means 21 for reading the restart counter value and to supply the subscriber context included in the subscriber context message to a context memory 25. The reading means 21 supplies the read counter value to a comparing means 23 which compares the read restart counter value with a previous restart counter value stored in a storing means 22 and which supplies the comparison result to a control means 24.

If the comparison result indicates that the received restart counter value is identical with the stored previous restart counter value, the control means 24 activates the context memory 25 so as to store the subscriber context included in the subscriber context message.

On the other hand, if the comparison result indicates that the received restart counter value differs from the previous restart counter value, the control means 24 controls the context memory 25 so as to delete or inactivate those stored subscriber contexts which relate to the transmitting network element 10 and to store the subscriber context included in the received subscriber context message.

Accordingly, only those subscriber contexts received before the restart operation are deleted or inactivated in the receiving network element 20.

It is to be noted, that the restart counter value not necessarily has to be added to the restart control message. As an alternativ, the adding means 14 could be replaced by a switching means used for switching the restart counter value from the restart counter 13, to the transmitter 15, so as to be transmitted separately or in a separate message to the receiving network element 20, wherein the control means 24 may then delete or inactivate the corresponding subscriber contexts received before the latest restart.

In the following a restoration procedure performed between an SGSN and a GGSN of a GPRS network is described on the basis of FIGS. 4 and 5.

Figure 4:
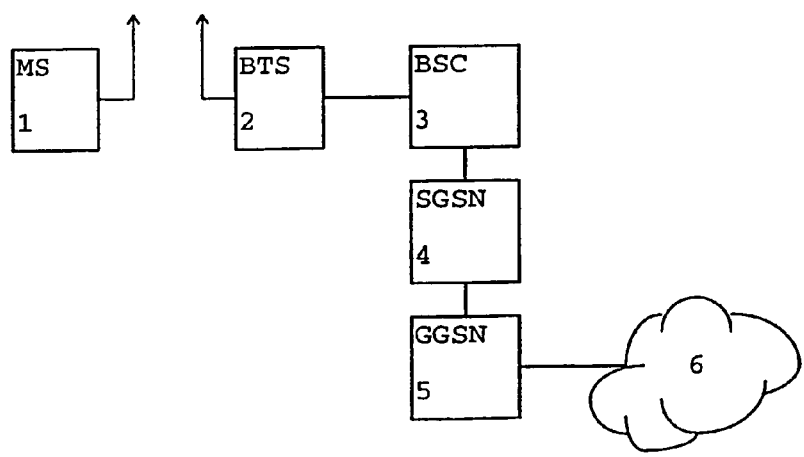
FIG. 4 shows a block diagram of a GPRS network in which a restoring method and system according to the preferred embodiment of the present invention is implemented.

FIG. 4 shows a principle block diagram of a GPRS system. According to FIG. 4, a mobile station (MS) 1 is radio-connected to a Base Transceiver Station (BTS) 2 which is connected to a Base Station Controller (BSC) 3. The BSC 3 is connected to a SGSN 4 which is connected to a GGSN 5. The SGSN 4 and the GGSN 5 constitute GPRS support nodes (GSN) which are the main elements of the GPRS.

The main functions of the GGSN 5 involve an interaction with an external data network 6. The GGSN 5 updates the location directory using rooting information supplied by the SGSN 4 about a path of the MS 1 and roots external data network protocol packets to the SGSN 4 currently serving the MS 1. It also decapsulates and forewards external data network packets to the appropriate data network and handles the billing of data traffic.

The main functions of the SGSN 4 are to detect new MSs 1 of the GPRS in its service area, handle the process of registering the new MSs along with the GPRS registers, send/receive data packets to/from the MS 1 and keep a record of the location of the MS 1 inside of its service area. The subscription information is stored in a GPRS register which acts as a data base from which the SGSN 4 can ask whether a new MS 1 in its area is allowed to join the GPRS network.

According to the preferred embodiment, a recovery information element including a restart counter value is included in a tunnel management signaling message sent between the SGSN 4 and the GGSN. Such a tunnel management signaling message can be used to control the PDP contexts in the GGSN 5. Each PDP context relates to mobile subscriber such as the MS 1.

According to the GPRS, tunnel management signaling messages include the messages Create PDP Context Request, Create PDP Context Response, Create AA PDP Context Request, Create AA PDP Context Response, Update PDP Context Request, Update PDP Context Response, Delete PDP Context Request, Delete PDP Context Response, Delete AA PDP Context Request, Delete AA PDP Context Response, Error Indication, PDU Notification Reject Request and PDU Notification Reject Response.

The recovery information element may also be conditional, i.e. it could be incorporated into the tunnel management signaling messages only if a GSN has been restarted and the GSN sends a signaling message to another GSN for the first time after restart. The GSN receiving the tunnel management signaling message is thus able to react on the corresponding restart as soon as possible, thus avoiding unnecessary inactivation of PDP contexts.

The PDU Notification Request and PDU Notification Responds messages are also part of the tunnel management signaling messages, but they need not include the recovery information element, because the PDU Notification Request causes the SGSN 4 to send either a Create (AA) PDP Context Request or a PDU Notification Reject Request message to the GGSN 5.

According to a minimal implementation, a recovery information element including the restart counter value is only incorporated into the messages Create (AA) PDP Context Request, Create (AA) PDP Context Response, Update PDP Context Request and Update PDP Context Response, because they are used to create new PDP contexts or to update an SGSN address of a PDP context in the GGSN 5.

In the following an example for a GPRS restoring method according to the preferred embodiment of the present invention is described with reference to FIG. 5.

Figure 5:
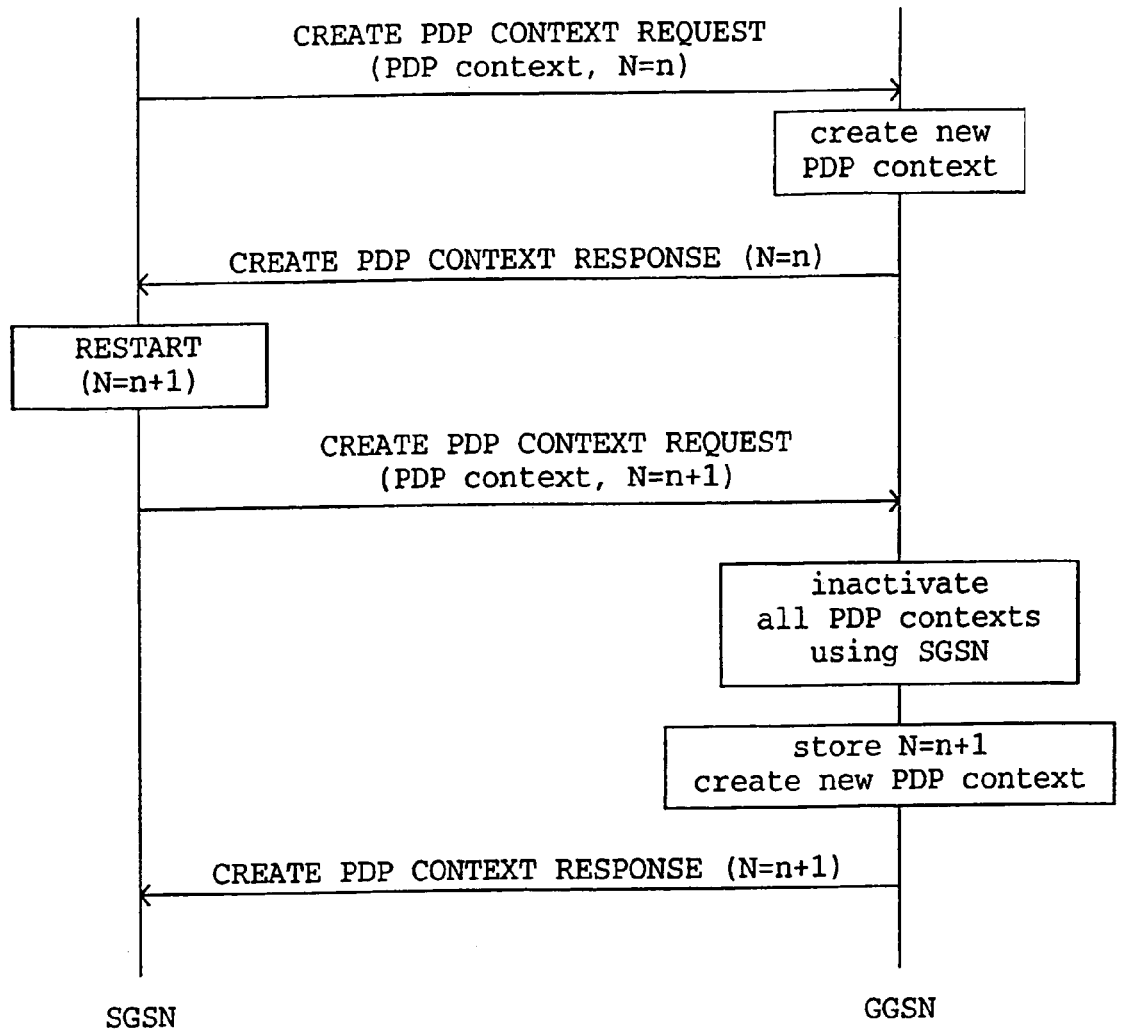
FIG. 5 shows an information transfer and processing diagram of a PDP context restoring method according to the preferred embodiment of the present invention.

FIG. 5 shows an information transfer and processing diagram indicating a restoring procedure performed between the SGSN 4 and the GGSN 5 based on a Create PDP Context Request message and a Create PDP Context Response message.

The SGSN 4 sends a Create PDP Context Request message to the GGSN 5, wherein the request message includes a restart counter value of the SGSN 4. If the restart counter value is the same as the GGSN 5 had previously stored for the SGSN 4, the GGSN creates the new PDP context in a normal manner. After having created the corresponding PDP context the GGSN 5 transmits a Create PDP Context Response message including the restart counter value of the GGSN 5 to the SGSN 4. If the restart counter value is the same as the SGSN 4 had previously stored for the GGSN 5, the SGSN 4 operates normally.

Now, it is assumed that a restart operation is performed in the SGSN 4 and the restart counter value of the SGSN 4 is incremented accordingly. Thus, if the SGSN 4 transmits a Create PDP Context Request message to the GGSN 5, the restart counter value differs from the value stored previously for the SGSN 4. Due to this, the GGSN 5 inactivates all PDP contexts using the SGSN 4 and creates the new PDP context included in the Create PDP Context message in a normal manner. After creating the corresponding PDP context, the GGSN 5 transmits a Create PDP Context Response message including its restart counter value to the SGSN 4. If the restart counter value is the same as the SGSN 4 had previously stored for the GGSN 5, the SGSN 4 operates normally. If the restart counter value differs from the value stored previously for the GGSN 5, the SGSN 4 inactivates all other PDP contexts using the GGSN 5, except for the one being created.

Thus, if a GSN is restarted, only PDP context that were activated before the restart and that use the restarted GSN are inactivated. Since the GSN receives the restart information as quickly as possible, resources reserved for the affected PDP contexts can be freed immediately.

It is to be pointed out, that the restoring method and system described in preferred embodiment can be used in connection with any mobile communication network where subscriber contexts are restored between network elements.

The above description of the preferred embodiment and the accompanying drawings are only intended to illustrate the present invention. The preferred embodiment of the invention may vary within the scope of the attached claims.

In summary, a method and system for restoring a subscriber context in a network element of a mobile communication network is described, wherein a new subscriber context which has been updated after the latest restart is indicated by transmitting a corresponding restart information to the network element. Based on the restart information the network element continues the use of new subscriber contexts updated after the latest restart and inactivates old subscriber contexts updated before the latest restart. Thereby, the amount of unnecessary subscriber context re-activations and corresponding downtime of the service is reduced. Moreover, the amount of signaling required after the restart is reduced, since a smaller number of subscriber contexts have to be re-established.

The invention claimed is:

1. A method for restoring a subscriber context in a mobile communication network, the method comprising:

storing restart information for a serving GPRS support node (SGSN) at a gateway GPRS support node (GGSN), the restart information indicating whether the SGSN has been restarted;

receiving a packet data protocol (PDP) context message at the GGSN from the SGSN, the PDP context message including restart information indicating whether the SGSN has been restarted;

creating a response to the PDP context message at the GGSN;

transmitting the response to the SGSN from the GGSN;

comparing the restart information of the PDP context message received with the stored restart information stored for the SGSN at the GGSN; and inactivating all subscriber contexts which are stored in the GGSN for use of the SGSN and have been updated before the latest restart of the SGSN when the restart information of the message received in the receiving step differs from the restart information stored for the SGSN.

2. A method according to claim 1, wherein said restart information comprises a restart counter value.

3. A method according to claim 2, wherein said restart counter value is compared with a stored restart counter value so as to determine said subscriber context updated before the latest restart.

4. A method according to claim 3, wherein said stored restart counter value is updated on the basis of said transmitted restart counter value.

5. A method according to claim 1, wherein said restart information is transmitted only one time after said latest restart.

6. A method according to claim 1, wherein said restart information is transmitted together with a tunnel management signaling message.

7. A method according to claim 1, wherein said PDP context message is a create or update PDP context request message.

8. A method according to claim 1, wherein the message received in the receiving step comprises a subscriber context create or update message.

9. A method according of claim 8, further comprising creating, as the response to the message, a subscriber context at the GGSN and transmitting a subscriber context response to the SGSN, wherein the subscriber context response includes the restart information indicating whether the GGSN has been restarted.

10. A system for restoring a subscriber context in a network element of a communication network comprising:
   storing unit configured to store restart information for a serving GPRS support node (SGSN) at a gateway GPRS support node (GGSN) the restart information indicating whether the SGSN has been restarted;
   receiving unit configured to receive a packet data protocol (PDP) context message at the GGSN from the SGSN-, the PDP context message including restart information indicating whether the SGSN has been restarted;
   control unit configured to inactive all subscriber contexts which are stored in the GGSN related to the SGSN and have been updated before said latest restart, in response to said restart information;
   transmitting unit configured to transmit a response message from the GGSN to the SGSN
   restart counter configured to count a restart number and adding unit configured to add said restart number to a subscriber context message,
   wherein the communication network includes at least the SGSN and the GGSN, the GGSN storing a plurality of subscriber contexts related to the SGSN.

11. A system according to claim 10, wherein said GGSN comprises a comparing unit configured to compare said restart number received with a restart number stored in a storing unit and to supply the comparing result to said control unit.

12. A system according to claim 10, wherein said control unit is configured to perform control so as to store a new subscriber context included in said subscriber context message and to delete an old subscriber context stored in said GGSN.

13. A system according to claim 10, wherein said transmitting unit comprises the restart counter configured to count a restart number, and wherein said control unit is configured to delete or inactivate corresponding subscriber contexts received before the latest restart.

14. A system according to claim 10, wherein said subscriber context is a PDP context.

15. A Serving GPRS Support Node (SGSN) for a mobile communication network, comprising:
   transmitting unit configured to transmit a packet data protocol (PDP) context message from the SGSN to a gateway GPRS support node (GGSN), the PDP context message including restart information, the restart information indicating whether the SGSN has been restarted; and
   receiving unit configured to receive a PDP context message from the GGSN, the PDP context message including restart information, the restart information indicating whether the GGSN has been restarted; and
   control unit configured to inactivate all subscriber contexts stored in the SGSN for the GGSN and having been updated before said latest restart when the restart information of the message received from the GGSN differs from the restart information stored for the GGSN.

16. An SGSN according to claim 15, further comprising a restart counter for counting a restart number, and adding unit configured to add said restart number to the PDP context message.

17. An SGSN according to claim 15, wherein said PDP context message is a create or update PDP context message.

18. An SGSN according to claim 17, wherein said PDP context message is a create or update PDP context request message.

19. An SGSN according to claim 15, wherein said restart information comprises a restart number and wherein said SGSN comprises comparing unit configured to compare said restart number with a restart number stored in a storing unit and to supply the comparing result to said control unit.

20. An SGSN according to claim 15, wherein said SGSN is configured to add the restart information to the PDP context message only if the SGSN has been restarted and the SGSN sends the PDP context message to the GGSN for the first time after the restart.

21. A method for restoring a subscriber context in a mobile communication network, the method comprising:
   storing, at a serving GPRS support node (SGSN), restart information for a gateway GPRS support node (GGSN) indicating whether the GGSN has been restarted;
   receiving a packet data protocol (PDP) context message from the GGSN at the SGSN, wherein the PDP context message includes restart information;
   comparing, at the SGSN, the restart information of the PDP context message with the restart information stored for the GGSN; and
   inactivating all subscriber contexts that are stored in the SGSN for use of the GGSN except those subscriber contexts for use of the GGSN that have been updated after the latest restart of the GGSN when the restart information of the message received in the received PDP context message, differs from the restart information stored for the GGSN,
   wherein the mobile communication network includes at least the SGSN and the GGSN, the SGSN storing a plurality of subscriber contexts for use of the GGSN, and the GGSN storing a plurality of subscriber contexts for use of the SGSN.

22. A Gateway GPRS Support Node (GGSN), for a mobile communication network, comprising:
   transmitting unit configured to transmit a packet data protocol (PDP) context message from the GGSN to a serving GPRS support node (SGSN), the PDP context message including restart information, the restart information indicating whether the GGSN has been restarted;
   receiving unit configured to receive a PDP context message from the SGSN, the PDP context message including restart information, the restart information indicating whether the SGSN has been restarted; and control unit configured to inactivate all subscriber contexts which are stored in the GGSN for the SGSN and have been updated before the latest restart of the SGSN when the restart information of the message received in the receiving step differs from the restart information stored for the SGSN; and to continue use of a received subscriber context created or updated after said latest restart.

23. The gateway GPRS support node (GGSN) of claim 22, wherein said PDP context message is a create or update PDP context message.

24. The gateway GPRS support node (GGSN) of claim 22, wherein said PDP context message is a create or update PDP context response message.

* * * * *